United States Patent
Yang

(10) Patent No.: US 9,995,518 B2
(45) Date of Patent: Jun. 12, 2018

(54) REFRIGERATOR AND METHOD FOR MANUFACTURING THE SAME

(71) Applicant: Dongbu Daewoo Electronics Corporation, Seoul (KR)

(72) Inventor: Sung Jin Yang, Seoul (KR)

(73) Assignee: Dongbu Daewoo Electronics Corporation, Seoul (KR)

( * ) Notice: Subject to any disclaimer, the term of this patent is extended or adjusted under 35 U.S.C. 154(b) by 260 days.

(21) Appl. No.: 14/838,052

(22) Filed: Aug. 27, 2015

(65) Prior Publication Data

US 2016/0370053 A1 Dec. 22, 2016

(30) Foreign Application Priority Data

Jun. 18, 2015 (KR) .................. 10-2015-0086753

(51) Int. Cl.
*F25C 1/04* (2018.01)
*F25C 5/00* (2018.01)
(Continued)

(52) U.S. Cl.
CPC ............... *F25C 1/04* (2013.01); *B23P 15/26* (2013.01); *F25C 5/182* (2013.01); *F25C 5/22* (2018.01);
(Continued)

(58) Field of Classification Search
CPC .. F25C 1/04; F25C 5/182; F25C 5/005; F25C 5/007; F25C 2400/10; B23P 15/26; F25D 23/028; F25D 29/005
(Continued)

(56) References Cited

U.S. PATENT DOCUMENTS 1,787,837 A * 1/1931 Powers .................... A23G 9/12
366/144
3,146,601 A * 9/1964 Gould .................... F25B 21/02
62/3.6
(Continued)

FOREIGN PATENT DOCUMENTS

KR 10-2008-0013639 A 2/2008
KR 10-0934185 12/2009
(Continued)

OTHER PUBLICATIONS

Extended European Search Report dated Oct. 26, 2016 issued in corresponding European Patent Application No. 15186846.0.

*Primary Examiner* — Len Tran
*Assistant Examiner* — Kirstin Oswald

(57) ABSTRACT

Embodiments of the present invention provide a refrigerator comprising: a main body including a food storage space and a cold air generation portion, a door installed on the main body to open and close the food storage space, an ice machine installed in the food storage space to generate ice, an ice bucket arranged in the ice machine to accommodate the ice therein, a motor system installed in the door, and a transport system which includes a first end portion that is rotatably coupled to a rear surface of the ice bucket and a second end portion that is docked with the motor system when the door is closed, and is rotated together with a motor of the motor system to transport the ice accommodated in the ice bucket when the motor of the motor system is rotated.

7 Claims, 5 Drawing Sheets

(51) Int. Cl.
*F25C 5/18* (2018.01)
*B23P 15/26* (2006.01)
*F25D 23/02* (2006.01)
*F25D 29/00* (2006.01)

(52) U.S. Cl.
CPC .............. *F25D 23/028* (2013.01); *F25C 5/24* (2018.01); *F25C 2400/10* (2013.01); *F25D 29/005* (2013.01)

(58) Field of Classification Search
USPC .......................................................... 62/340
See application file for complete search history.

(56) References Cited

U.S. PATENT DOCUMENTS

| | | | | |
|---|---|---|---|---|
| 3,199,309 A * | 8/1965 | Brubuker | .................. | F25C 1/10 62/233 |
| 3,270,519 A * | 9/1966 | Pohl, Jr. | .................... | F25C 1/24 62/300 |
| 3,422,994 A * | 1/1969 | Alvarez | .................. | F25C 5/002 222/240 |
| 3,537,132 A * | 11/1970 | Alvarez | .................... | F25C 1/24 62/266 |
| 3,537,273 A * | 11/1970 | Alvarez | .................... | F25C 1/24 222/233 |
| 3,572,053 A * | 3/1971 | Jacobus | .................... | F25C 1/24 222/140 |
| 3,843,067 A * | 10/1974 | Prada | ...................... | F25C 5/005 241/190 |
| 3,889,888 A * | 6/1975 | Prada | ...................... | F25C 5/005 241/101.1 |
| 4,084,725 A * | 4/1978 | Buchser | .................. | F25C 5/005 221/75 |
| 4,087,140 A * | 5/1978 | Linstromberg | ......... | F25C 5/005 312/273 |
| 4,095,439 A * | 6/1978 | Linstromberg | ......... | F25C 5/005 312/274 |
| 4,619,380 A * | 10/1986 | Brooks | ................... | F25C 5/005 222/146.6 |
| 5,050,777 A * | 9/1991 | Buchser | ................. | A23G 9/045 198/550.1 |
| 6,082,130 A * | 7/2000 | Pastryk | .................... | F25C 5/005 222/146.6 |
| 6,438,976 B2 * | 8/2002 | Shapiro | ...................... | F25C 1/10 62/135 |
| 7,017,363 B2 * | 3/2006 | Lee | ............................ | F25C 1/04 241/DIG. 17 |
| 7,395,672 B2 * | 7/2008 | Krause | .................... | F25C 5/005 241/DIG. 17 |
| 8,671,708 B2 * | 3/2014 | Jeong | ....................... | F25C 5/007 62/320 |
| 2001/0025505 A1 * | 10/2001 | Nelson | .................... | F25C 5/005 62/371 |
| 2004/0163405 A1 * | 8/2004 | Jung | ........................ | F25C 5/005 62/344 |
| 2005/0056043 A1 * | 3/2005 | Lee | ........................ | F25C 5/005 62/344 |
| 2005/0229623 A1 * | 10/2005 | Kim | ...................... | B67D 1/0858 62/389 |
| 2006/0260345 A1 * | 11/2006 | Coulter | .................. | F25D 11/02 62/340 |
| 2008/0011010 A1 * | 1/2008 | Koons | ..................... | F25C 5/005 62/344 |
| 2009/0165492 A1 * | 7/2009 | Wilson | ..................... | F25C 1/10 62/344 |
| 2010/0000249 A1 * | 1/2010 | Kim | .......................... | F25C 1/08 62/340 |
| 2010/0257887 A1 | 10/2010 | Hwang | | |
| 2010/2577889 | 10/2010 | Lee | | |
| 2012/0031136 A1 * | 2/2012 | Park | ....................... | F25D 11/02 62/340 |
| 2013/0167575 A1 | 7/2013 | Hong et al. | | |
| 2013/0327076 A1 * | 12/2013 | Jeong | ..................... | F25C 5/005 62/321 |
| 2014/0290300 A1 | 10/2014 | Jeong et al. | | |

FOREIGN PATENT DOCUMENTS

| | | |
|---|---|---|
| KR | 10-2011-0038369 A | 4/2011 |
| KR | 10-2013-0078531 A | 7/2013 |
| KR | 10-2013-0137524 A | 12/2013 |
| KR | 10-2014-0120217 | 10/2014 |
| MX | 2014014856 A | 12/2014 |
| WO | 2008/035913 A1 | 3/2008 |
| WO | 2010/123177 A1 | 10/2010 |

* cited by examiner

REFRIGERATOR AND METHOD FOR MANUFACTURING THE SAME

CROSS-REFERENCE TO RELATED APPLICATIONS

This application is based on and claims priority from Korean Patent Application No. 10-2015-0086753, filed on Jun. 18, 2015 for inventor Sung Jin Yang. The disclosure of this application is incorporated herein in its entirety by reference.

FIELD OF THE INVENTION

The present invention relates to a refrigerator and a method for manufacturing the same, and more particularly to a refrigerator including an ice machine and a method for manufacturing the same.

BACKGROUND OF THE INVENTION

A refrigerator is an appliance that serves to store food at low temperatures; it may be configured to store food at temperatures below freezing or at low but above freezing temperatures.

The temperature inside the refrigerator is maintained at the desired level by cool air that is continuously supplied to the refrigerator. The cool air is continuously produced by a heat exchange operation between air and a refrigerant performed in a refrigeration cycle comprising four sequential phases: compression, condensation, expansion, and evaporation. Cool air is channeled to the inside of the refrigerator and is evenly distributed inside the refrigerator by convection.

The body of a refrigerator typically has a rectangular hexahedral shape that opens frontward, with a refrigerator compartment and a freezer compartment defined and isolated from one another within the refrigerator body. The open front of the refrigerator body may comprise both a refrigerator compartment door and a freezer compartment door that can open or close the refrigerator compartment and the freezer compartment, respectively. The storage space defined inside the refrigerator may comprise a plurality of drawers, shelves, and boxes designed to store various kinds of food in various optimal states.

In the related art, a top mount type refrigerator in which the freezer compartment is provided in the upper part of the refrigerator body and the refrigerator compartment is provided in the lower part of the refrigerator body is well known. However, in recent years, for greater convenience to users, a bottom freezer type refrigerator in which the freezer compartment is provided in the lower part of the refrigerator body has been proposed and used. The bottom freezer type refrigerator may be preferable since the more frequently used refrigerator compartment is located in the upper part of the refrigerator body and the less frequently used freezer compartment is located in the lower part of the refrigerator body. However, the bottom freezer type refrigerator is problematic in that to take ice cubes from the freezer compartment, a user must open the freezer compartment door and collect ice cubes while bending.

In an effort to solve the problem, in recent years, a refrigerator in which an ice dispenser for dispensing ice cubes is provided in a refrigerator compartment door placed in the upper part of a bottom freezer type refrigerator has been proposed and used. In such a refrigerator, an ice making device for making ice cubes may be provided in the refrigerator compartment door or inside the refrigerator compartment.

The ice machine may include an ice maker provided with an ice tray generating ice, and an ice bucket in which the generated ice is stored. The ice generated in the ice maker may be dropped and accumulated in the ice bucket that is positioned on a lower side of the ice tray.

Further, the ice accumulated in the ice bucket may be transported to a discharge portion through a transport system. For example, the transport system may be an auger having screw or spiral-shaped wings. When the transport system, such as an auger, is rotated, the ice accumulated in the ice bucket may be disposed between the wings of the auger and may be transported in a direction in which the ice is guided through the wings.

However, according to the existing refrigerator, a motor system for rotating the transport system is installed inside the ice machine, usability of a space in the ice machine is lowered due to a space that is occupied by the motor system.

Further, since the motor system is installed in the existing ice machine, it is required to arrange an ice making system in front of an upper portion of the motor system so as to prevent the ice that is generated by the ice making system from being dropped to the motor system. In order to arrange the ice making system in front of the upper portion of the motor system, it is necessary to additionally install an air supply duct for supplying cold air to the ice making system in the rear of the ice making system. The usability of the space in the ice machine becomes further deteriorated due to the space occupied by the air supply duct, and a loss of cold air may occur in the process of supplying the cold air through the air supply duct.

SUMMARY OF THE INVENTION

In view of the above, the present invention provides a refrigerator with heightened inner capacity utilization for an ice machine and a manufacturing method thereof.

Further, the present invention provides a refrigerator which can reduce a loss of cold air that is supplied to an ice maker by removal of unnecessary cold air supply ducts and a manufacturing method thereof.

In accordance with an aspect of the present invention, a refrigerator is provided, comprising: a motor system installed in the door; and a transport system which includes a first end portion that is rotatably coupled to a rear surface of the ice bucket and a second end portion that is docked with the motor system when the door is closed, and is rotated together with a motor of the motor system to transport the ice accommodated in the ice bucket when the motor of the motor system is rotated.

In accordance with another aspect of the present invention, a method for manufacturing a refrigerator, is provided, the method comprising: preparing a main body comprising a food storage space and a cold air generation portion; preparing a door installed on the main body to open or close the food storage space; preparing an ice machine installed in the food storage space to generate ice; preparing an ice bucket arranged in the ice machine to accommodate the ice; installing a motor system in the door; and preparing a transport system, which includes a first end portion that is rotatably coupled to a rear surface of the ice bucket and a second end portion that is docked with the motor system when the door is closed, and is rotated together with a motor of the motor system to transport the ice accommodated in the ice bucket when the motor of the motor system is rotated.

BRIEF DESCRIPTION OF THE DRAWINGS

The objects and features of the present invention will become apparent from the following description of embodiments given in conjunction with the accompanying drawings, in which.

DETAILED DESCRIPTION OF THE EMBODIMENTS

Hereinafter, constructions and actions according to embodiments of the present invention will be described in detail with reference to the accompanying drawings. In describing the embodiments of the present invention, a detailed description of known constructions or functions will be omitted if it is deemed that such description would make the gist of the present invention unnecessarily vague.

Figure 1:
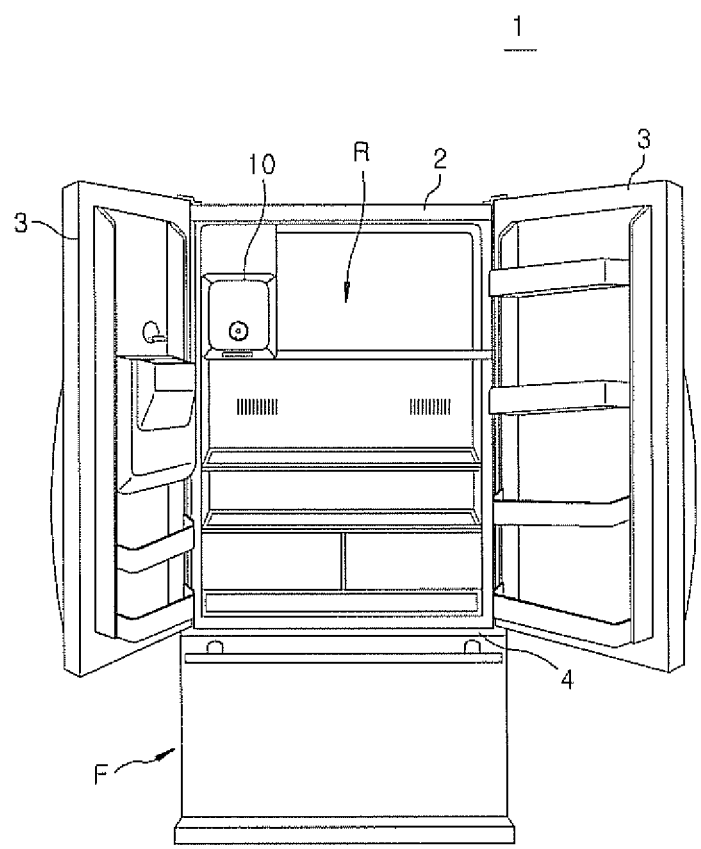
FIG. 1 is a view illustrating a refrigerator according to an embodiment of the present invention.

FIG. 1 is a view illustrating a refrigerator according to an embodiment of the present invention.

Referring to FIG. 1, a refrigerator 1 according to this embodiment may include a main body 2 including a food storage space R having an opened front surface and a cold air generation portion (not illustrated) generating cold air, a door 3 installed on the front surface of the main body and configured to open or close the food storage space R, and an ice machine 10 installed in the food storage space R and configured to generate ice.

In this embodiment, it is exemplified that the ice machine 10 is provided on one side of an upper portion of the food storage space R. However, this is merely exemplary, and the ice machine 10 may also be installed in another position of the food storage space R. Further, in the refrigerator 1 according to this embodiment, the food storage space R that is formed in the main body 2 may be used as a refrigerating compartment. Further, the refrigerator 1 according to this embodiment may further include a freezing compartment F which is partitioned separately from the refrigerating compartment through a barrier 4 that is provided on the lower side of the food storage space R that is used as the refrigerating compartment.

Figure 2:
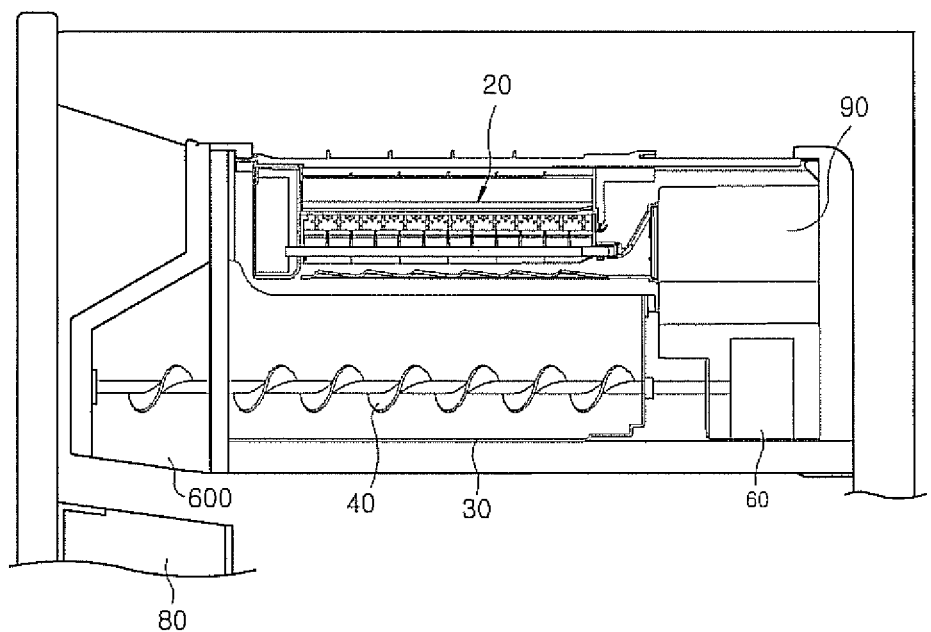
FIG. 2 is a side cross-sectional view illustrating an ice machine of a refrigerator according to an embodiment of the present invention.

FIG. 2 is a side cross-sectional view of an ice machine for a refrigerator according to an embodiment of the present invention. Referring to FIG. 2, an ice machine 10 that is included in a refrigerator according to this embodiment may include an ice maker 200, an ice bucket 300, and a transport system 400.

The ice maker 200 may include an ice tray 210 which receives cold air generated in a cold air generation portion (not included) located in the main body 2 and generates ice, and an ice separation system 230 which drops the ice that is generated in the ice tray.

The ice tray 210 provides a space in which water that is supplied from a water supply pipe (not illustrated) is frozen to ice, and is provided with a plurality of formation spaces provided on an upper surface thereof to accommodate the water therein. The formation spaces may have various shapes according to the shape of the ice to be generated, and the number of the formation spaces may be variously adjusted.

The cold air may be supplied to the ice tray 210 through a cold air guide portion 220. Specifically, the cold air guide portion 220 may guide a flow of the cold air so that the cold air that is supplied from a cold air generation portion moves along the bottom surface of the ice tray 210. If the cold air is supplied through the cold air guide portion 220, the cold air exchanges heat with the ice tray 210, and the water that is accommodated in the ice tray 210 is phase-changed to ice.

The ice so generated may be dropped down by the ice separation system 230. The ice separation system 230 may comprise a rotating system which drops the ice that is generated in the ice tray 210 by rotating the ice tray 210. Specifically, an upper surface of the ice tray 210 may be rotated downward through rotation of a rotating shaft 231, and if the ice tray 210 is rotated over a predetermined angle, it is twisted through interference of a predetermined interference member (not illustrated), and the ice accommodated in the ice tray 210 may be dropped down by such twisting. The rotating shaft 231 may be rotated by a motor 232 in a rotating shaft motor housing 233. In another embodiment, a plurality of ejectors (not illustrated) may be provided along the length direction of the rotating shaft 231, and through rotation of the ejectors, only ice will be taken out from the ice tray 210 while the ice tray 210 is not rotated.

The ice bucket 300 that accommodates the ice that is dropped from the ice tray 210 may be located on the lower side of the ice maker 200. If the ice that is generated in the ice tray 210 is dropped down by the ice separation system 230, the ice may be received in the ice bucket 300.

The ice loaded in the ice bucket 300 may be transported to a discharge portion 700 through the transport system 400. The ice that is discharged through the discharge portion 700 may be supplied to a dispenser 800 that is installed in the door 3. Further, although not illustrated, a cutting member that can cut the ice to a predetermined size may be provided in the discharge portion 700.

The transport system 400 may be an auger that includes a shaft 410 and screw or spiral-shaped wings 420 attached to the shaft 410. If the transport system is rotated about the shaft 410, the ice accumulated in the ice bucket may be transported in a direction in which the ice is guided through the wings 420, e.g., in a direction of the discharge portion 700.

A motor system 600 that generates a driving force to rotate the transport system 400 may be installed in the door 3. The motor system 600 may include a motor 610, and a rotating system 620 that is coupled to the rotating shaft of the motor 610 to be rotated.

A first end portion of the transport system 400 may be rotatably coupled to the rear surface of the ice bucket 300, and a second end portion of the transport system 400 may be docked with the rotating system 620 of the motor system 600 that is installed in the door 3 when the door 3 is closed. If the second end portion of the transport system 400 is docked with the rotating system 620 of the motor system 600, it is rotated together with the rotating system 620 to rotate the transport system 400.

Figure 3:
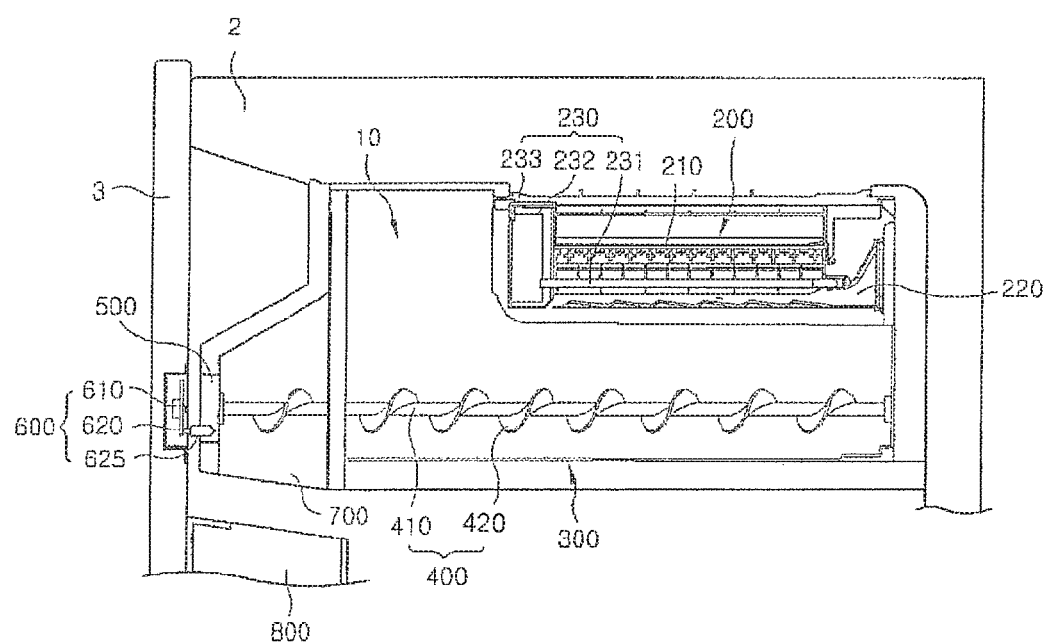
FIG. 3 is a side cross-sectional view illustrating an ice machine of a refrigerator in the related art.

Traditionally, as illustrated in FIG. 3, since the motor system 60 is installed in the rear of the ice tray 30, the motor system 60 occupies some space in the ice machine. Further, traditionally, the ice maker 20 is located in a front of the upper portion of the motor system 60 so as to prevent the ice that is generated by the ice maker 20 from being dropped to the motor system 60. According to the related art, in order to arrange the ice maker 20 in front of the upper portion of the motor system 60, it is necessary to additionally install an air supply duct 90 for supplying cold air to the ice maker 20 in the rear of the ice maker 20. Accordingly, the usability of the space in the ice machine becomes further deteriorated due to the space occupied by the air supply duct 90, and a loss of cold air may occur in the process of supplying the cold air through the air supply duct 90. However, in the embodiment of the present invention described above, the motor system 600 is not installed in the ice machine 10, but is rather installed in the door 3. Further, according to the embodiment of the present invention as described above, the size of the ice tray 210 can be extended as much as the space that is occupied by the cold air supply duct 90 on the upper portion of the motor system, and thus the number of ice cells provided in the ice tray 210 can be increased.

On the other hand, the second end portion of the transport system 400 may be configured to be directly docked with the rotating system 620 of the motor system 600 that is installed in the door 3 when the door 3 is closed, or may yet be configured to be docked with the rotating system 620 through a connection system 500.

Figure 4:
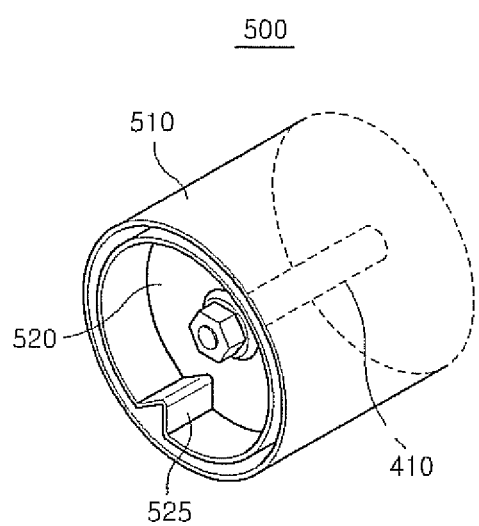
FIG. 4 is a view illustrating a connection system that is included in an ice machine of a refrigerator according to an embodiment of the present invention.

FIG. 4 is a view illustrating a connection system that is included in an ice machine of a refrigerator according to an embodiment of the present invention. Referring to FIG. 4, the connection system 500 may include a hollow support member 510 installed in front of the ice bucket 300 and a docking member 520 rotatably coupled to a hollow portion of the support member 510.

The rotating system 620 of the motor system 600 may be docked with the docking member 520 to rotate the docking member 520, and the docking member 520 may be coupled to the second end portion of the transport system 400 to rotate the transport system 400 when the docking member 520 is rotated. As illustrated in FIG. 4, the end portion of the shaft 410 of the transport system 400 may be screw-fastened to the docking member 520. However, this fastening structure is merely exemplary, and various fastening structures may be adopted.

In order to transfer the driving force from the rotating system 620 to the docking member 520, the rotating system 620 may further include a rod 625, and the docking member 520 may further include a rod seat portion 525 on which the rod 625 is seated to receive the driving force. The rod 625 may be formed to project from a position that is eccentric from the rotating shaft of the rotating system 620 toward the docking member 520, and the rod seat portion 525 may be manufactured in a rib shape so that the rod 625 can be seated and supported on the rod seat portion 525 when the rotating system 620 and the docking member 520 are docked with each other. In this case, if the rotating system 620 is rotated, the rod 625 pushes the rod seat portion 525 to rotate the docking member 520. However, such structures and shapes are merely exemplary, and the rod seat portion 525 may be formed with various structures and shapes to transfer the driving force that is transferred from the rod to the transport system 400. For example, the rod seat portion 525 may be formed in a hollow groove shape into which the rod 625 can be inserted.

When the rotating system 620 and the docking member 520 are docked with each other through closing of the door 3, the rod 625 and the rod seat portion may interfere with each other. In this case, the door 3 is not completely closed, and according to circumstances, the rod 625 and the rod seat portion 525 may be damaged. In order to prevent the interference between the rod 625 and the rod seat portion 525, the rod 625 may be configured to be drawn in or drawn out to project according to circumstances. For example, the rod 625 may be provided with an elastic body, such as a spring, therein, and may be configured in a manner that if it interferes with the rod seat portion 525, it is drawn in, while if it does not interfere with the rod seat portion 525, it is drawn out to project. Further, it is also possible that the rod seat portion 525 is configured to be drawn in or drawn out instead of the rod 625, and in this case, an elastic body, such as a spring, may be provided in the rod seat portion 525.

Figure 5:
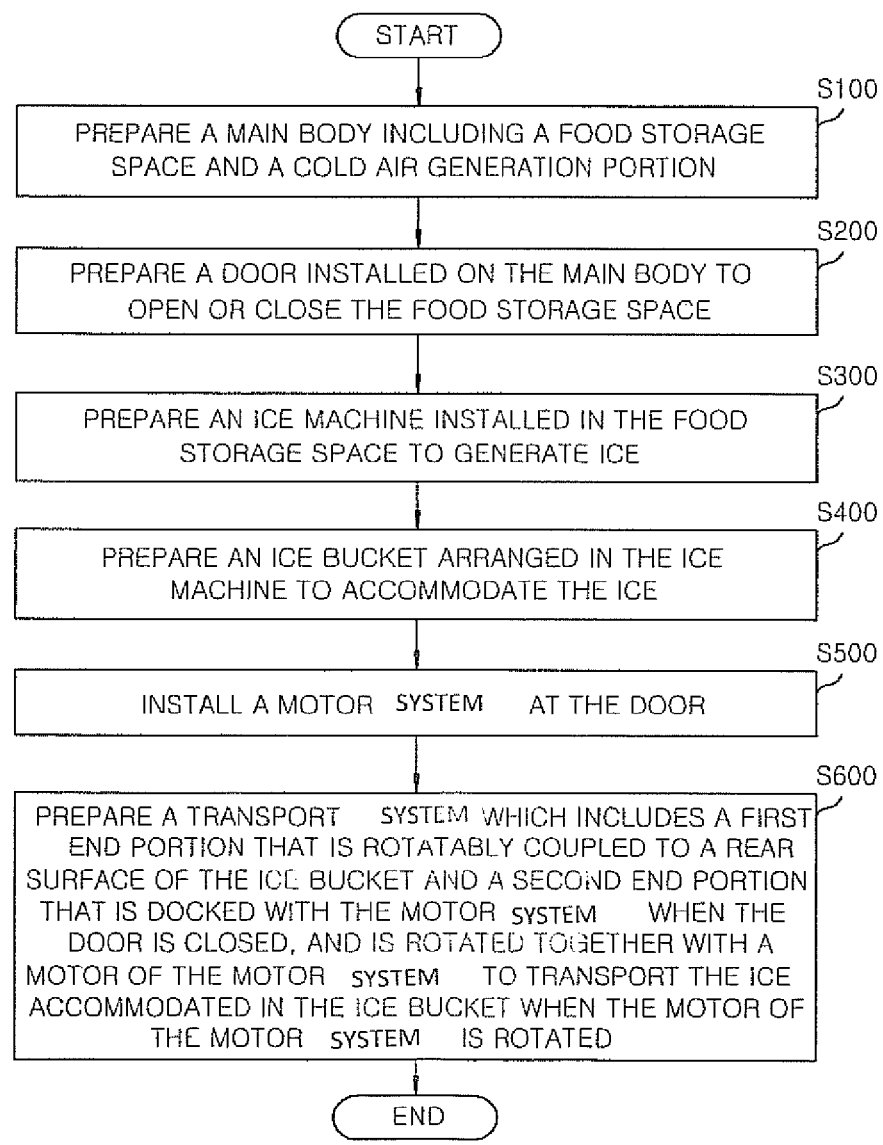
FIG. 5 is a flowchart illustrating a method for manufacturing a refrigerator according to an embodiment of the present invention.

FIG. 5 is a flowchart illustrating a method for manufacturing a refrigerator according to an embodiment of the present invention.

Referring to FIGS. 1, 2, and 5, a method for manufacturing a refrigerator 1 according to this embodiment may include preparing a main body (S100), preparing a door (S200), preparing an ice machine (S300), preparing an ice bucket (S400), installing a motor system in the door (S500), and preparing a transport system (S600). However, the order of the steps illustrated in FIG. 5 is merely exemplary, and the method for manufacturing a refrigerator according to the present invention is not limited to follow the above-described order. The steps illustrated in FIG. 5 may be changed, and some steps may be performed in parallel.

In preparing the main body (S100), the main body 2 that includes a food storage space R and a cold air generation portion (not illustrated) may also be prepared.

The food storage space R may have an opened front surface, and the cold air generation portion may be arranged in the rear of the main body 2. However, this is merely exemplary, and the present invention is not limited thereto.

In preparing the door (S200), the door 3 that is installed on the main body 2 to open or close the food storage space R may be prepared.

In preparing the ice machine (S300), the ice machine 10 that is installed in the food storage space R to generate ice may be prepared. The ice machine 10 may be provided on one side of an upper portion of the fool storage space R, or may be installed in another position of the food storage space R.

In preparing the ice bucket (S400), the ice bucket 300 that is arranged in the ice machine 10 to accommodate ice may be prepared. On the rear surface of the ice bucket 300, a groove or a hollow, into which the transport system 400 is coupled, may be formed.

FIG. 5 illustrates that the step (S500) of installing the motor system in the door is separated from the step (S200) of preparing the door. However, the step (S500) of installing the motor system in the door may be included in the step (S200) of preparing the door, and thus the motor system 600 may be installed in the process of preparing the door 3.

In preparing the transport system (S600), the transport system 400, which includes a first end portion that is rotatably coupled to the rear surface of the ice bucket 300 and a second end portion that is docked with the motor system 600 when the door 3 is closed, and is rotated together with the motor 610 of the motor system 600 to transport the ice accommodated in the ice bucket 300 when the motor 610 of the motor system 600 is rotated. The embodiment illustrated in FIG. 6 shows the step (S600) of preparing the transport system separate from the step (S400) of preparing the ice bucket. However, the step (S600) of preparing the transport system may be included in the step (S400) of preparing the ice bucket, and thus the transport system 400 may be prepared in the process of preparing the ice bucket 300.

Although steps of preparing various constituent elements included in a refrigerator according to an embodiment of the present invention are not specifically included in the flowchart of FIG. 5, the method for manufacturing a refrigerator according to an embodiment of the present invention may further include the steps of preparing such constituent elements.

As described above, the embodiments of the present invention can provide a refrigerator with a heightened inner capacity for an ice machine and a manufacturing method thereof.

Further, the present invention can provide a refrigerator which can reduce a loss of cold air that is supplied to an ice maker through removal of unnecessary cold air supply ducts, and a manufacturing method for such a refrigerator.

Further, since the unnecessary cold air supply ducts are removed, the manufacturing cost can be lower, and inefficiencies, such as freezing due to cold air leakage, duct clogging, and deterioration of an ice making speed, which may occur in the case where separate components are used, can be eliminated.

Further, since the cold air loss can be reduced, the time required to make ice can be shortened, and the amount of ice generated can be increased.

Further, since the motor system is attached to the door, the space in the ice making compartment becomes widened, the size of the ice bucket can be increased, and the amount of ice generated can be increased.

Further, since the space in the ice making compartment is widened, the number of ice trays can be increased, and the amount of ice generated can be increased.

While the present invention has been described with respect to the preferred embodiments, the present invention is not limited thereto. It will be understood that a person having ordinary skill in the art to which the present invention pertains may substitute and change components without any limitation and these substitutions and changes also belong to the scope of the present invention.

What is claimed is:

1. A refrigerator comprising:
   a main body comprising a food storage space and a cold air generation portion;
   a door installed on the main body to open and close the food storage space;
   an ice machine installed in the food storage space to generate ice;
   an ice bucket arranged in the ice machine to receive the ice therein;
   a motor system installed in the door; and
   a transport system which includes a first end portion rotatably coupled to a rear surface of the ice bucket and a second end portion configured to be docked with the motor system only when the door is closed, wherein the transport system rotates together with a motor of the motor system to transport the ice accommodated in the ice bucket when the second end portion is docked with the motor system and when the motor of the motor system is rotated,
   wherein the motor system comprises a rotating system coupled to a rotating shaft of the motor,
   wherein the ice machine comprises a connection system configured to make the second end portion of the transport system be docked with the rotating system only when the door is closed,
   wherein the connection system comprises a hollow support member installed in front of the ice bucket and a docking member rotatably coupled to a hollow portion of the hollow support member,
   wherein the rotating system includes a rod formed to project from a portion that is eccentric from a rotating shaft of the rotating system toward the docking member, and
   wherein the docking member includes a rod seat portion on which the rod is seated to receive a driving force when the rotating system is rotated.

2. The refrigerator of claim 1, further comprising an ice maker comprising an ice tray which receives cold air from the cold air generation portion and generates the ice, and an ice separation system which drops the ice that is generated in the ice tray to the ice bucket.

3. The refrigerator of claim 1, wherein the rod is seated and supported on the rod seat portion when the rotating system and the docking member are docked with each other, and wherein when the rotating system is rotated, the rod pushes the rod seat portion to rotate the docking member.

4. The refrigerator of claim 1, wherein when the second end portion is docked with the motor system, the rotating system of the motor system is docked with the docking member to rotate the docking member, and wherein the docking member is coupled to the second end portion of the transport system to rotate the transport system together when the docking member is rotated.

5. The refrigerator of claim 1, wherein the rod is configured to be drawn in when it interferes with the rod seat portion during closing of the door and to project when it does not interfere with the rod seat portion.

6. The refrigerator of claim 1, wherein the rod seat portion is configured to be drawn in when it interferes with the rod during closing of the door and to project when it does not interfere with the rod.

7. A method for manufacturing a refrigerator, the method comprising:
   preparing a main body including a food storage space and a cold air generation portion;
   preparing a door installed on the main body to open or close the food storage space;
   preparing an ice machine installed in the food storage space to generate ice;
   preparing an ice bucket arranged in the ice machine to accommodate the ice;
   installing a motor system in the door; and
   preparing a transport system, which includes a first end portion rotatably coupled to a rear surface of the ice bucket and a second end portion configured to be docked with the motor system only when the door is closed, wherein the transport system rotates together with a motor of the motor system to transport the ice accommodated in the ice bucket when the second end portion is docked with the motor system and when the motor of the motor system is rotated,
   wherein said installing the motor system comprises coupling a rotating system to a rotating shaft of the motor,
   wherein said preparing the ice machine comprises preparing a connection system configured to make the second end portion of the transport system be docked with the rotating system only when the door is closed,
   wherein said preparing the connection system comprises installing a hollow support member in front of the ice bucket and coupling a docking member rotatably to a hollow portion of the hollow support member, and wherein the rotating system includes a rod formed to project from a portion that is eccentric from a rotating shaft of the rotating system toward the docking member, wherein the docking member includes a rod seat portion on which the rod is seated to receive a driving force when the rotating system is rotated.

\* \* \* \* \*